(12) United States Patent
Tarapchak

(10) Patent No.: US 9,605,773 B1
(45) Date of Patent: Mar. 28, 2017

(54) ADJUSTABLE PIPE SUPPORT SYSTEM

(71) Applicant: Hunter Highway, Inc., Drums, PA (US)

(72) Inventor: Robert Tarapchak, Lattimer, PA (US)

(73) Assignee: HUNTER HIGHWAY, INC., Drums, PA (US)

( * ) Notice: Subject to any disclaimer, the term of this patent is extended or adjusted under 35 U.S.C. 154(b) by 0 days.

(21) Appl. No.: 14/979,626

(22) Filed: Dec. 28, 2015

(51) Int. Cl.
*F16L 1/00* (2006.01)
*F16L 3/10* (2006.01)

(52) U.S. Cl.
CPC ................... *F16L 3/1091* (2013.01)

(58) Field of Classification Search
CPC .......... H02G 3/32; H02G 3/30; H02G 3/0608; H02G 3/26; H02G 3/0456; H02G 3/263; H02G 3/22; H02G 3/0418; H02G 3/0437; H02G 3/0443; H02G 11/00; H02G 3/0487; H02G 11/006; H02G 3/045; H02G 3/0431; F16L 3/24; F16L 3/223; F16L 3/237; F16L 3/2235; F16L 55/035; F16L 3/22; F16L 3/13; F16L 3/222; F16L 3/04; F16L 3/221; F16L 3/233; F16L 3/23; F16L 3/1075; F16L 3/227; F16L 3/137; F16L 3/02
USPC ......... 248/49, 65, 68.1, 71, 73, 354.3, 354.4
See application file for complete search history.

(56) References Cited

U.S. PATENT DOCUMENTS

| | | |
|---|---|---|
| 2,395,033 A | 2/1946 | Black |
| 2,684,222 A | 7/1954 | Miller |
| 3,152,784 A | 10/1964 | Robinson |
| 3,713,259 A | 1/1973 | Tkach |
| 4,140,292 A | 2/1979 | Kaigler, Jr. et al. |
| 4,252,466 A | 2/1981 | Berti et al. |
| 4,445,656 A | 5/1984 | Leitch et al. |
| 5,110,073 A | 5/1992 | Schoenky |
| 5,516,069 A * | 5/1996 | Hanna ................. E04F 15/0247 248/354.1 |
| 5,561,950 A * | 10/1996 | Collins .................... E02D 27/32 248/354.3 |
| 5,819,482 A | 10/1998 | Belke et al. |
| 5,862,635 A | 1/1999 | Linse et al. |
| 6,206,613 B1 | 3/2001 | Elkins |
| 6,592,093 B2 * | 7/2003 | Valentz ..................... F16L 3/00 248/346.01 |
| 6,679,460 B2 | 1/2004 | Nicolia et al. |

(Continued)

*Primary Examiner* — Steven Marsh
(74) *Attorney, Agent, or Firm* — Mitchell A. Smolow

(57) ABSTRACT

An adjustable pipe support system is formed by fixing to a support column a top and bottom support plate, each plate comprising a respective orifice aligned with the other. A tube comprising a lubricating material fitting is fixed at each end to a respective support plate and aligned with the orifices, thereby forming a lubricating material receiving housing. Inserted into each orifice is a threaded adjusting bushing comprising internal threads and a shoulder contact flange. The adjusting bushings are sized such that when the inserted shoulder shoulder contact flanges are stopped by the support plate a space remains between the two contact bushing ends. A threaded stud first end is threadingly received by the threaded adjusting bushings. A threaded stud second end comprises a support member. As each threaded adjusting bushing is tightened the shoulder shoulder contact flanges seal against the support plates to laterally stabilize the threaded stud and contain the lubricating material within the housing.

20 Claims, 7 Drawing Sheets

(56) References Cited

U.S. PATENT DOCUMENTS

| | | |
|---|---|---|
| 8,206,063 B2 | 6/2012 | Patton |
| 8,931,763 B2 | 1/2015 | Tharp et al. |
| 2002/0011548 A1 | 1/2002 | Parker |
| 2002/0171013 A1* | 11/2002 | Nicolia ............... F16L 3/133 248/74.1 |
| 2014/0166824 A1* | 6/2014 | Tarapchak ............ F16L 3/20 248/49 |

* cited by examiner

ADJUSTABLE PIPE SUPPORT SYSTEM

FIELD OF THE INVENTION

This invention relates generally to pipe supports and in particular, to an adjustable pipe support system.

BACKGROUND OF THE INVENTION

In many industrial applications, for example, the oil and gas industry, piping is used to transport product. Due to the length of a pipe run and the weight of the pipe itself, the pipe must be supported over the length of the run. To assist in both initial pipe placement and to compensate for changes in the supporting strata over time vertically adjustable pipe supports have been developed.

There are many known adjustable pipe support designs. One example of such a support includes a support bracket mounted to a threaded rod, the rod adjustably received by a threaded cylinder mounted to a support plate. Other known supports include a threaded rod received through one or more mounting plates and fixed to the plate(s) with conventional nuts.

In all known vertical adjustable pipe supports, resistance to lateral deflection remains problematic.

Accordingly, there is still a continuing need for improved laterally stable, vertically adjustable pipe support designs. The present invention fulfills this need and further provides related advantages.

BRIEF SUMMARY OF THE INVENTION

In a preferred embodiment, a vertically mounted I beam is modified to receive a top and bottom support plate, each plate comprising a respective orifice aligned with the other. A tube comprising a lubricant fitting is fixed at each end to a respective support plate and aligned with the orifices, thereby forming a lubricant receiving housing.

A threaded adjusting bushing comprising internal threads and a shoulder contact flange is inserted into each orifice. The adjusting bushings are sized such that when the inserted shoulder contact flanges are stopped by the support plate a space remains between the two adjusting bushing ends.

A threaded stud first end is threadingly received by the threaded adjusting bushings. A threaded stud second end comprises a support member. As each threaded adjusting bushing is tightened the shoulder contact flanges seal against the support plates to laterally stabilize the threaded stud and contain the lubricant within the housing.

Other features and advantages of the present invention will be apparent from the following more detailed description of the preferred embodiments, taken in conjunction with the accompanying drawings which illustrate, by way of example, the principles of the invention.

BRIEF DESCRIPTION OF THE DRAWINGS

The accompanying drawings are included to provide a further understanding of the present invention. These drawings are incorporated in and constitute a part of this specification, illustrate one or more embodiments of the present invention, and together with the description, serve to explain the principles of the present invention.

Figure 1:
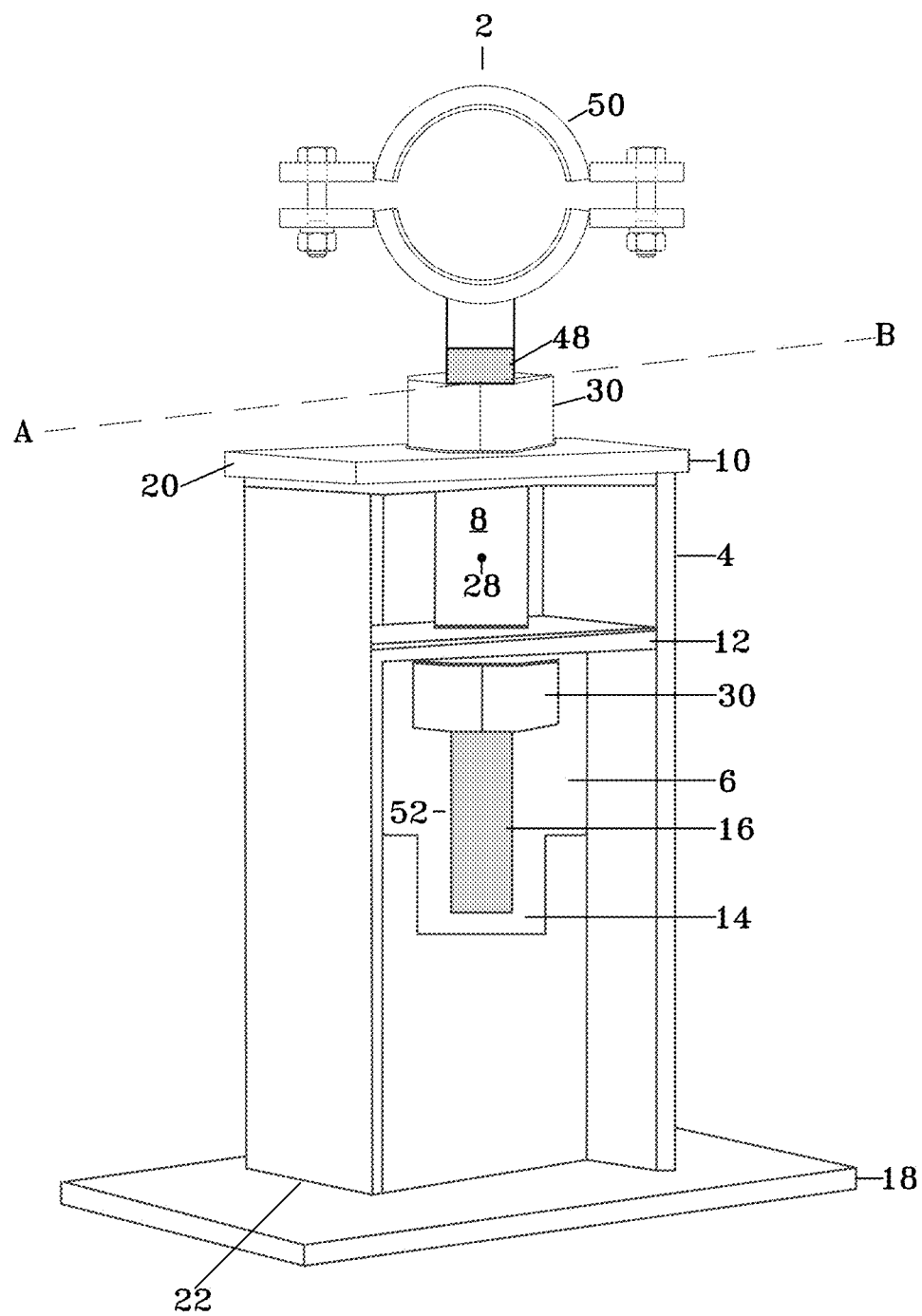
FIG. 1 is a perspective view of the adjustable pipe support system.

Other features and advantages of the present invention will be apparent from the following more detailed description of the preferred embodiments, taken in conjunction with the accompanying drawings which illustrate, by way of example, the principles of the invention.

DETAILED DESCRIPTION OF THE INVENTION

As required, detailed embodiments of the present invention are disclosed; however, it is to be understood that the disclosed embodiments are merely exemplary of the invention that may be embodied in various forms. The figures are not necessary to scale, and some features may be exaggerated to show details of particular components. Therefore, specific structural and functional details disclosed are not to be interpreted as limiting, but merely as a basis for the claims and as a representative basis for teaching one skilled in the art to variously employ the present invention. Where possible, like reference numerals have been used to refer to like parts in the several alternative embodiments of the present invention described herein.

Figure 4:
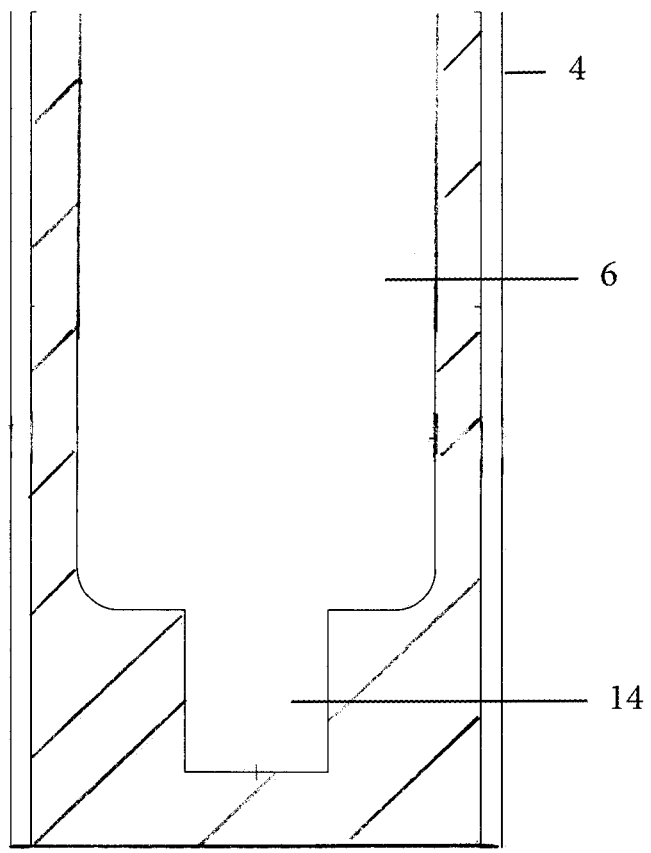
FIG. 4 is a front view of a machined support column.

Turning now to the figures, a conventional H-style support column 4, shown in FIG. 4, for example, a standard W series beam or American standard beam, is machined to form a cutout 6. The cutout 6 has a geometry which permits mounting of a lubricant housing 8, a top support plate 10, a lower support plate 12, and a space 14 for a threaded stud 16.

The support column 4 is fixed, for example, welded, to, for example, a column support plate 18. The top support plate 10 is fixed, for example, welded, to the top of the support column 4. Preferably each end 20 of the top support plate rests upon the support column 4 and most preferably each top support plate end 20 extends beyond the support column 4 to provide maximum structural integrity.

Figure 5:
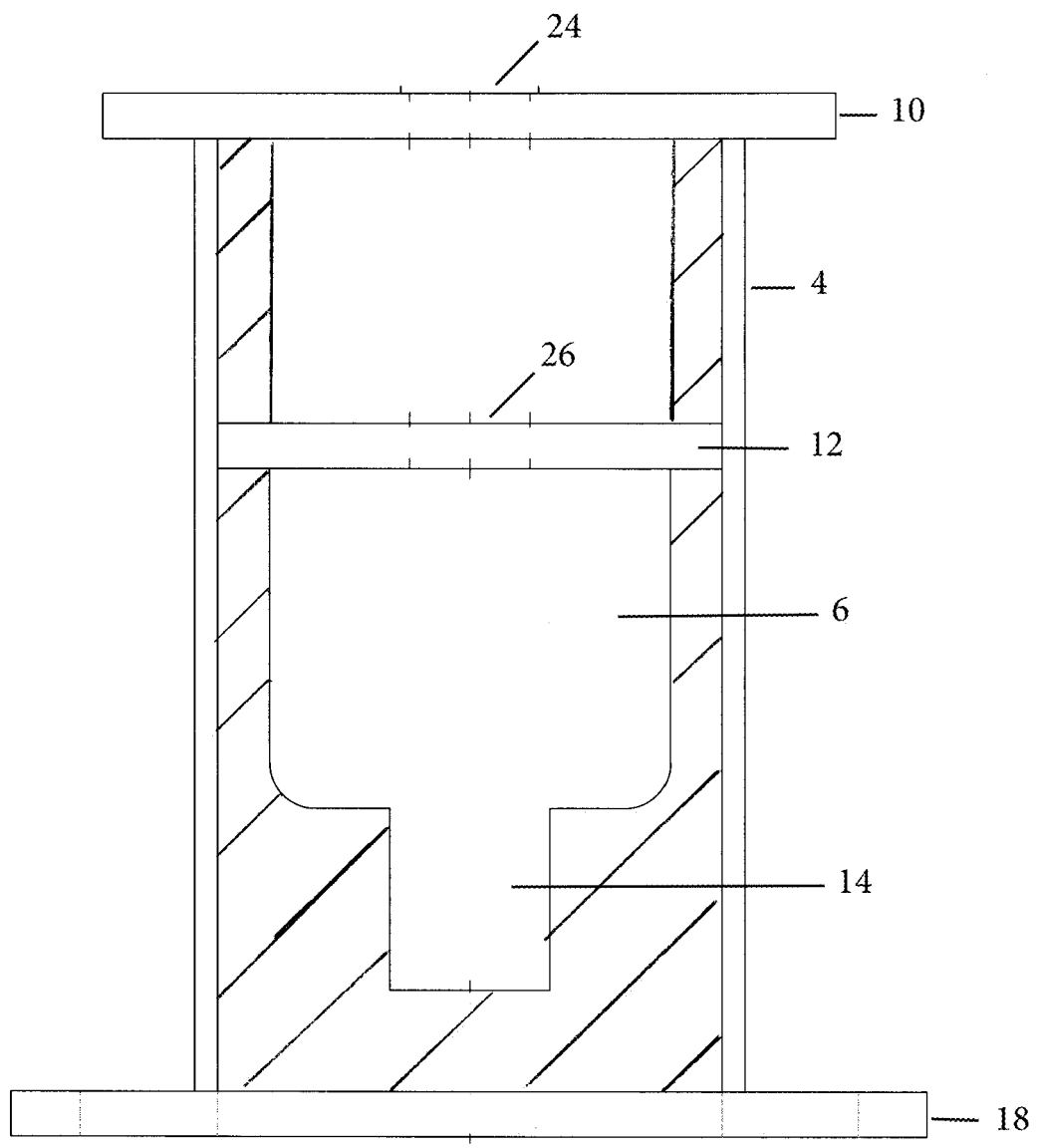
FIG. 5 is a front view of the support column and support plates.

The column support plate 18 is fixed, for example, welded, to the support column bottom 22 and is positioned substantially parallel to the top plate 10. The top support plate 10 and lower support plate 12 each have an orifice 24, 26, respectively, substantially aligned with one another as shown in FIG. 5. The lubricant housing 8 is sealingly fixed, for example, welded, between the top support plate 10 and lower support plate 12 in alignment with the two orifices 24, 26.

The lubricant housing 8 is a hollow housing, for example, square steel tube, DOM, schedule 40 or schedule 80 steel pipe. A lubricant fitting 28, for example, a grease fitting, is fixed to the lubricant housing 8 allowing lubricant (not shown) to be introduced into an assembled pipe support system 2.

Figure 6:
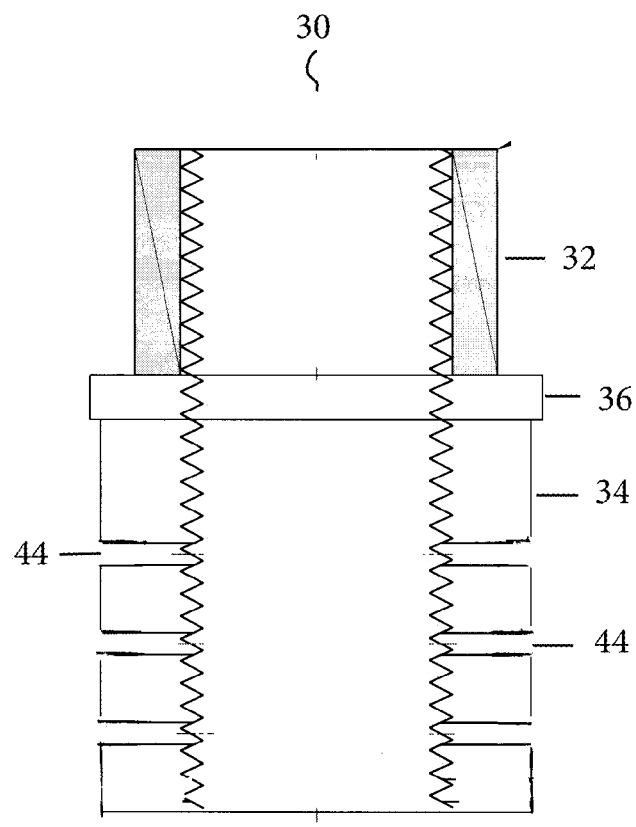
FIG. 6 is a front view of a threaded adjusting bushing after a vertical cut at line C-D of FIG. 7.
Figure 7:
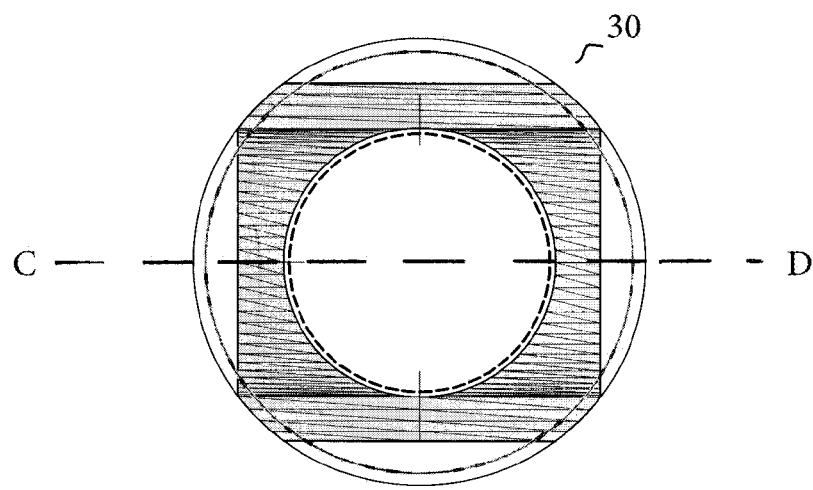
FIG. 7 is a top view of a threaded adjusting bushing.

Turning now to FIG. 6, a threaded adjusting bushing 30 comprises an adjusting end 32 and a bushing extension 34. The adjusting end 32 has a geometry to accept an adjusting tool (not shown), for example, a square or hex nut geometry. The bushing extension 34 extends from a shoulder contact flange 36. The shoulder contact flange 36 has a geometry that completely covers an orifice 24, 26 when the bushing extension 34 is fully seated into an orifice 24, 26 as described below. The threaded adjusting bushing 30 is threaded internally to threadingly receive the threaded stud 16. The bushing extension may comprise at least one lubricant orifice 44 to help introduce lubricant (not shown) onto the threaded stud 16.

Figure 8:
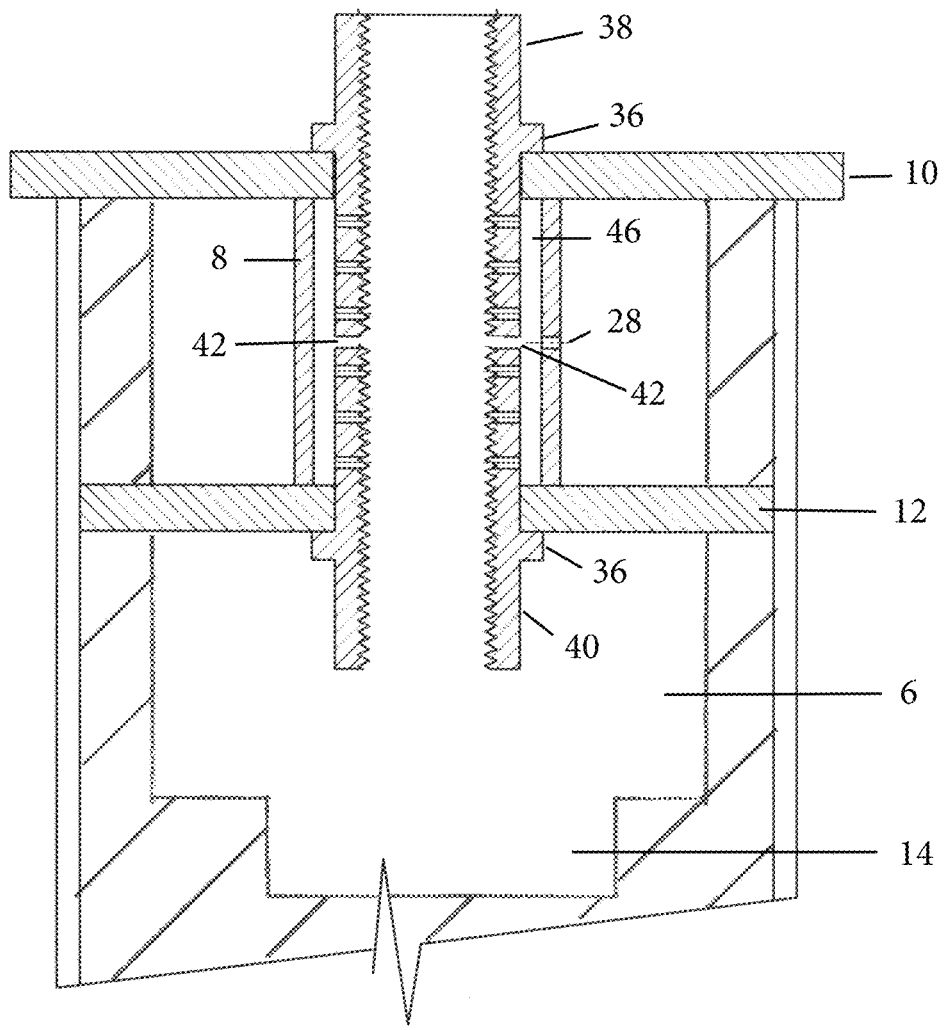
FIG. 8 is a front view of a portion of the adjustable pipe support system after a vertical cut at line A-B of FIG. 1 with the threaded stud not shown.

Turning to FIG. 8, when the pipe support system 2 is assembled, a top threaded adjusting bushing 38 is inserted into the top support plate orifice 24 and a lower threaded adjusting bushing 40 is inserted into the lower support plate orifice 26. The lengths of the top and lower threaded adjusting bushings 38, 40 are such that once fully seated into their respective orifices 24, 26, a bushing gap 42 remains between the two bushing extensions 34, thereby allowing for passage of lubricant. Preferably, the bushing gap 42 is a minimum of about ⅛".

The threaded adjusting bushing 30 is preferably sized so that there is a lubricant space 46 created between the bushing extension 34 and the lubricant housing 8 when the bushing extension 34 is fully seated. Preferably the lubricant space 46 is greater than about 1/16" and is most preferably about 3/16", however, the lubricant space 46 can be larger.

Figure 2:
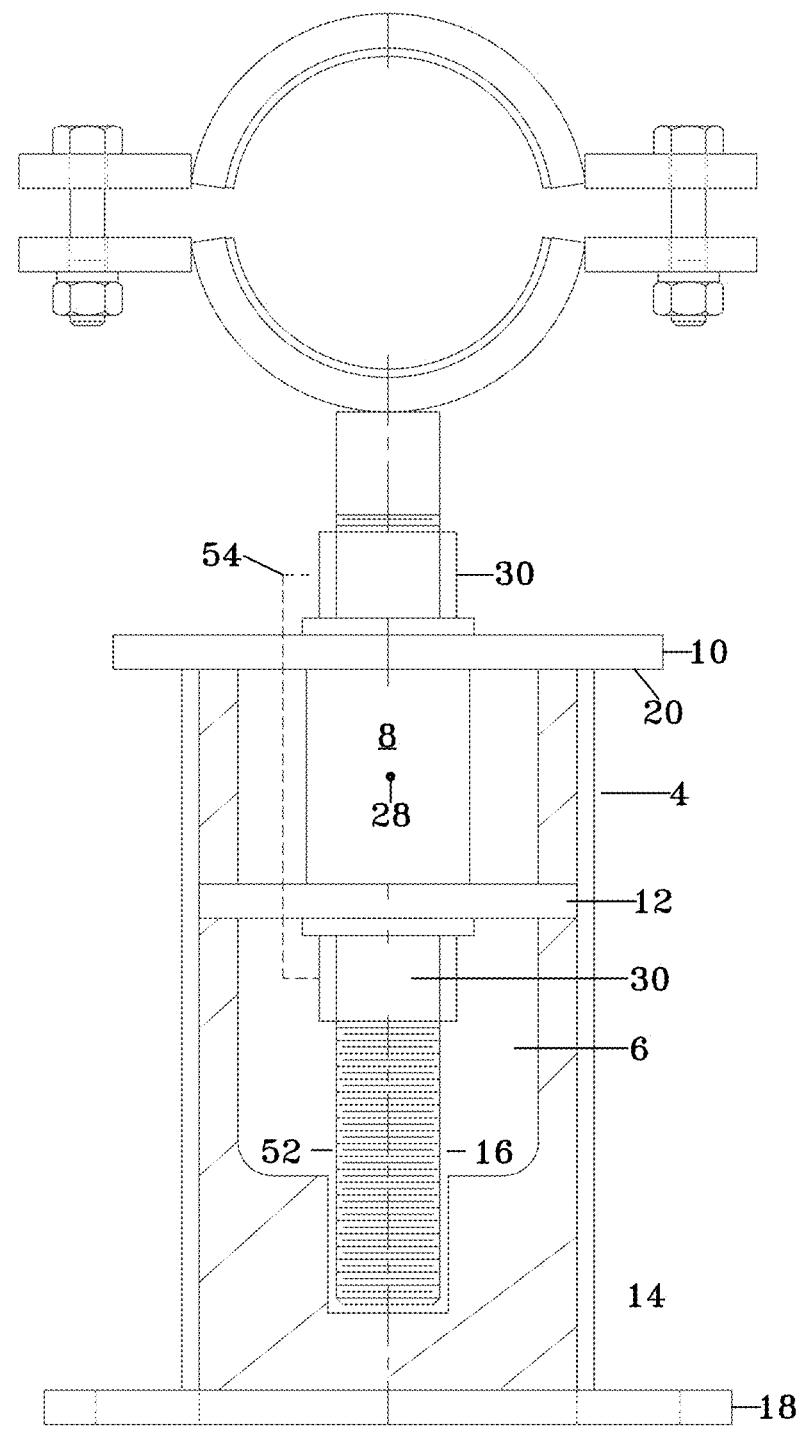
FIG. 2 is a front view of the adjustable pipe support system.
Figure 3:
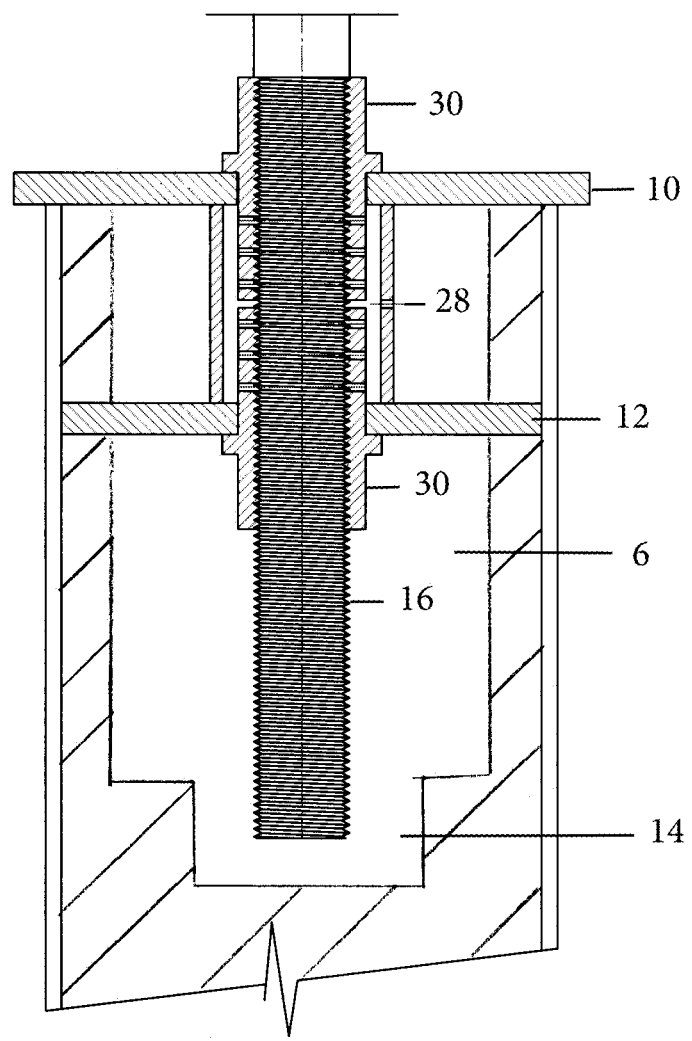
FIG. 3 is a front view of a portion of the adjustable pipe support system after a vertical cut at line A-B of FIG. 1.

Each support plate orifice 24, 26 is preferably smaller in diameter than the diameter of the lubricant housing 8. In this manner, the seated threaded adjusting bushing 30 produces the preferable lubricant space 46. When fully assembled and tightened, the shoulder contact flanges 36 and sealingly fixed lubricant housing 8 form a threaded bushing assembly 54 (FIG. 2) containing the lubricant. The lubricant fitting 28, lubricant space 46, bushing gap 42, and lubricant orifice 44 allow for lubrication of the threaded stud 16. To enhance lateral stability of the assembled support system 2, preferably, the minimal tolerance between the threaded adjustment bushing 30 and support plate orifice 24, 26 is about 0.010".

Returning to FIG. 1, a threaded stud second end 48 threadingly receives a support member 50, for example, a closed clamp, saddle support with or without U-bolt(s), flat plate, flange plate, flange cradle, or threaded stud. A threaded stud first end 52 is threadingly received by the threaded bushing assembly 54.

In use, a top threaded adjusting bushing 38 is threaded onto an optionally pre-lubricated threaded stud first end 52. The threaded stud 16 is inserted through a top support plate orifice 24 through a lubricant housing 8 to exit through a lower support plate orifice 26. A lower threaded adjusting bushing 40 is then threaded onto the threaded stud first end 52. After fully seating the top threaded adjusting bushing 38, the threaded stud 16 is threaded inward or outward to position the threaded stud 18 at the desired height for a threaded support member 50. Once positioned, the lower threaded adjusting bushing 40 is tightened to fully seat. Lubricant is added, as necessary, through the lubricant fitting 28.

If subsequent adjustment is required, the top and lower threaded adjustment bushings 38, 40 are turned opposite to one another, thereby drawing the threaded stud 16 inward or outward of the lubricant housing 8. In this manner the relative location of the support member 50 is changed.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:
1. A bushing assembly comprising:
   a top internally threaded adjusting bushing comprising an adjusting end and a bushing extension extending from a top shoulder contact flange;
   a lower internally threaded adjusting bushing comprising an adjusting end and a bushing extension extending from a lower shoulder contact flange;
   a top support plate comprising a top orifice;
   a lower support plate comprising a lower orifice, the top and lower orifice substantially aligned with one another; and
   a lubricant housing sealingly fixed between the top and lower support plates;
   wherein the lubricant housing is positioned such that the top internally threaded adjusting bushing inserts through the top orifice into the lubricant housing until stopped by the top shoulder contact flange; the lower internally threaded adjusting bushing inserts through the lower orifice into the lubricant housing until stopped by the lower shoulder contact flange; and each flange sealingly covers its respective orifice.

2. The bushing assembly of claim 1 further comprising a bushing gap between a fully inserted top bushing extension and a fully inserted lower bushing extension.

3. The bushing assembly of claim 2 further comprising a lubricant space between each fully inserted internally threaded adjusting bushing and the lubricant housing; and wherein the lubricant housing further comprises a lubricant fitting.

4. The bushing assembly of claim 3 wherein each bushing extension further comprise at least one lubricant orifice.

5. An adjustable pipe support system comprising:
   a support column;
   a threaded stud;
   a support member fixed to a threaded stud second end; and
   a bushing assembly threadingly receiving a threaded stud first end;
   wherein the bushing assembly comprises:
      a top internally threaded adjusting bushing comprising an adjusting end and a bushing extension extending from a top shoulder contact flange;
      a lower internally threaded adjusting bushing comprising an adjusting end and a bushing extension extending from a lower shoulder contact flange;
      a top support plate fixed to the support column comprising a top orifice;
      a lower support plate fixed to the support column comprising a lower orifice, the top and lower orifice substantially aligned with one another; and
      a lubricant housing sealingly fixed between the top and lower support plates;
      wherein the lubricant housing is positioned such that the top internally threaded adjusting bushing inserts through the top orifice into the lubricant housing until stopped by the top shoulder contact flange; the lower internally threaded adjusting bushing inserts through the lower orifice into the lubricant housing until stopped by the lower shoulder contact flange; and each flange sealingly covers its respective orifice.

6. The adjustable pipe support system of claim 5 further comprising a bushing gap between a fully inserted top bushing extension and a fully inserted lower bushing extension.

7. The adjustable pipe support system of claim 6 further comprising a lubricant space between each fully inserted internally threaded adjusting bushing and the lubricant housing; and wherein the lubricant housing further comprises a lubricant fitting.

8. The adjustable pipe support system of claim 7 wherein each bushing extension further comprise at least one lubricant orifice.

9. The adjustable pipe support system of claim 5 wherein the top support plate is fixed to a top of the support column and each top support plate end extends beyond the support column.

10. The adjustable pipe support system of claim 8 wherein the top support plate is fixed to a top of the support column and each top support plate end extends beyond the support column; and the lower support plate is positioned substantially parallel to the top support plate.

11. The adjustable pipe support system of claim 10 wherein the bushing gap is a minimum of about ⅛" and the lubricant space is greater than about 1/16".

12. The adjustable pipe support system of claim 11 wherein the lubricant space is greater than about 3/16".

13. The adjustable pipe support system of claim 5 wherein each support plate orifice is smaller in diameter than a diameter of the lubricant housing.

14. The adjustable pipe support system of claim 13 wherein a minimal tolerance between a threaded attachment bushing and a support plate orifice is about 0.010".

15. The adjustable pipe support system of claim 12 wherein the support column comprises a cutout having a geometry to permit fixing of the top support plate, the lower support plate, the lubricant housing, and the threaded stud; each support plate orifice is smaller in diameter than a diameter of the lubricant housing; and
the support column is fixed at a bottom end to a column support plate.

16. A method of installing an adjustable pipe support system comprising the steps of:
threading a top threaded adjusting bushing onto a threaded stud first end;
inserting the threaded stud first end through a support column top support plate orifice, then through a lubricant housing, to exit through a support column lower support plate orifice;
threading a lower threaded adjusting bushing onto the threaded stud first end;
fully seating the top threaded adjusting bushing;
threading the threaded stud inward or outward to position a threaded stud second end;
tightening the lower adjusting bushing to fully seat;
fixing a support member to the threaded stud second end; and
adding lubricant to a busing assembly;
wherein the bushing assembly comprises:
the top internally threaded adjusting bushing comprising an adjusting end and a bushing extension extending from a top shoulder contact flange;
the lower internally threaded adjusting bushing comprising an adjusting end and a bushing extension extending from a lower shoulder contact flange;
the support column top support plate orifice contained within a top support plate fixed to the support column;
the support column lower support plate orifice contained within a lower support plate fixed to the support column, the top and lower orifice substantially aligned with one another; and
the lubricant housing sealingly fixed between the top and lower support plates;
wherein the lubricant housing is positioned such that the top internally threaded adjusting bushing inserts through the top orifice into the lubricant housing until stopped by the top shoulder contact flange; the lower internally threaded adjusting bushing inserts through the lower orifice into the lubricant housing until stopped by the lower shoulder contact flange; and each flange sealingly covers its respective orifice.

17. The method of claim 16 wherein the bushing assembly further comprises a bushing gap between a fully inserted top bushing extension and a fully inserted lower bushing extension.

18. The method of claim 17 wherein the bushing assembly further comprises a lubricant space between each fully inserted internally threaded adjusting bushing and the lubricant housing; and wherein the lubricant housing further comprises a lubricant fitting and each bushing extension further comprise at least one lubricant orifice.

19. The method of claim 16 wherein the column support top support plate is fixed to the top of the support column and each column support top support plate end extends beyond the support column; and the lower support plate is positioned substantially parallel to the top support plate.

20. The method of claim 16 further comprising the step of turning the top and lower threaded adjustment bushings opposite to one another, thereby drawing the threaded stud inward or outward of the lubricant housing.

* * * * *